Inventor:
George G. Nearing,
By Jas. C. Wobensmith
Attorney.

March 7, 1933. G. G. NEARING 1,900,193
PROMOTING PLANT GROWTH
Filed Oct. 8, 1931 2 Sheets-Sheet 2

Inventor:
George G. Nearing,
By Jas. C. Wobensmith
Attorney

Patented Mar. 7, 1933

1,900,193

UNITED STATES PATENT OFFICE

GEORGE G. NEARING, OF CHADDS FORD, PENNSYLVANIA

PROMOTING PLANT GROWTH

Application filed October 8, 1931. Serial No. 567,567.

My invention relates to the promotion of plant growth, and it relates more particularly to the utilization of indirect sunlight, by means of which better results may be obtained than have heretofore been possible in the reproduction and growth of certain plants.

My invention has been found to be particularly successful in the reproduction of rhododendrons from cuttings, in causing the same to take root more effectively, and thus resulting in a much higher percentage of new plants from cuttings than has heretofore been obtained, and also causing the resulting plants to be more sturdy.

Heretofore, it has been recognized in the reproduction of certain plants, both by seed germination and asexually, that direct sunlight is harmful. It has therefore been customary to coat the glass of hot beds, cold frames, or greenhouses, as the case may be, with a semi-transparent paint, to cut down the amount of sunlight that reaches the plants. In other cases the glass has been coated with stripes of more or less opaque paint for the same purpose, advantage being taken in this way of the relative movement between the surface of the earth and the sun, to cut down the total amount of sunlight reaching the plants.

I have found that, in the growing of certain plants, much better results can be obtained by the total elimination of direct sunlight, provided that at the same time means be provided for increasing the amount of modified indirect sunlight over that which would normally reach the plants if they were merely shaded from the direct rays of the sun.

The object, therefore, of my present invention is to provide means for shielding certain plants, in the process of development, from the direct rays of the sun, and at the same time increasing the amount of modified indirect sunlight over that which would normally fall upon the plants when they are shaded from the direct rays of the sun.

The nature and characteristic features of my invention will be more readily understood from the following description, taken in connection with the accompanying drawings forming part hereof, in which.

Figure 1:
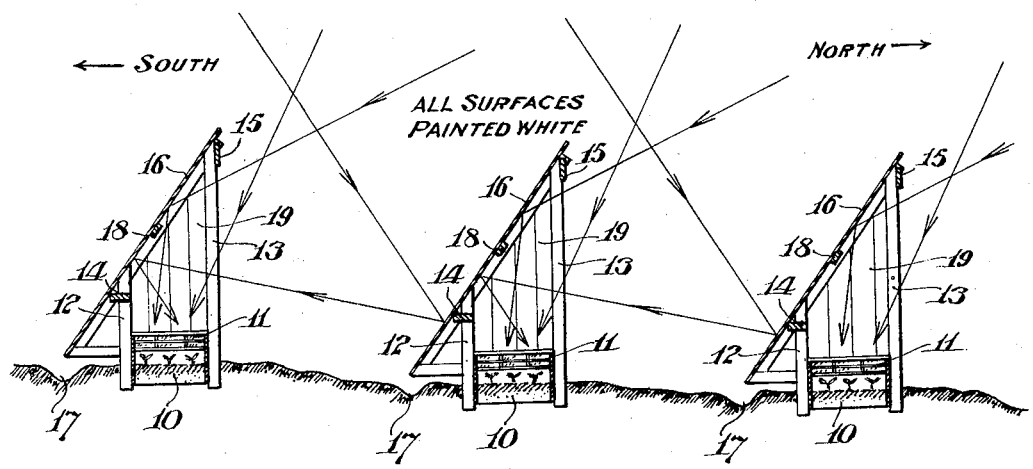
Figure 1 is a transverse sectional view of a series of structures constructed and arranged to embody the main features of my present invention, the same being shown in connection with a series of cold frames of a usual type.
Figure 2:
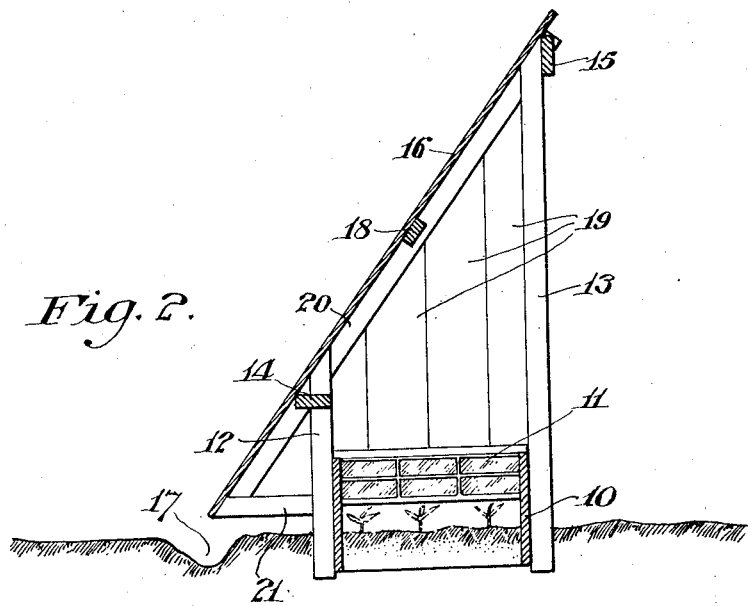
Fig. 2 is an enlarged transverse sectional view of one of said structures.
Figure 3:
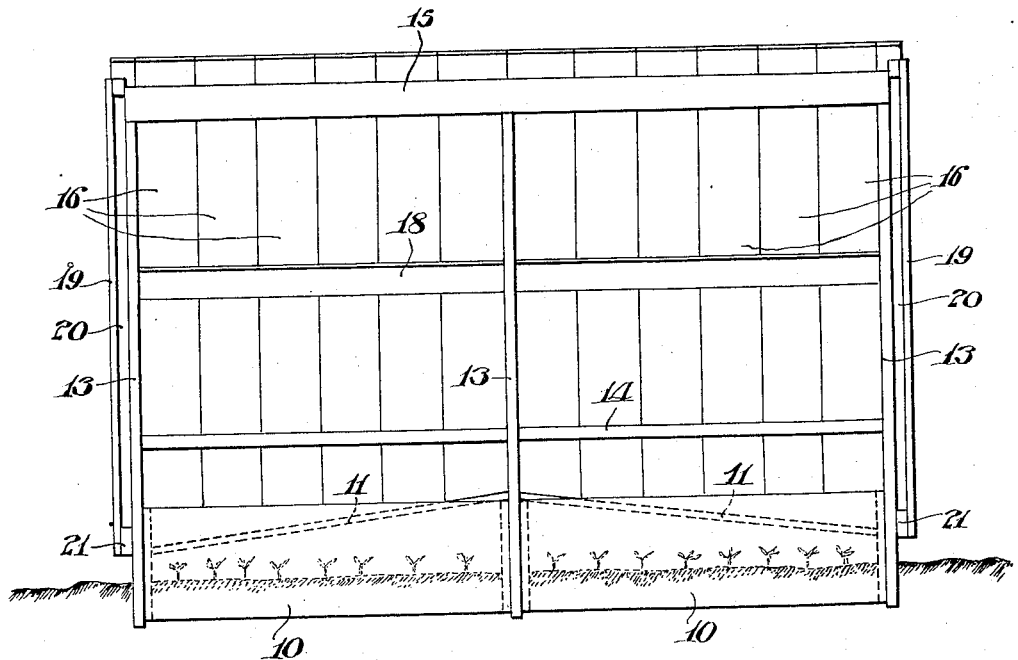
Fig. 3 is a front elevation thereof, looking from the north.
Figure 4:
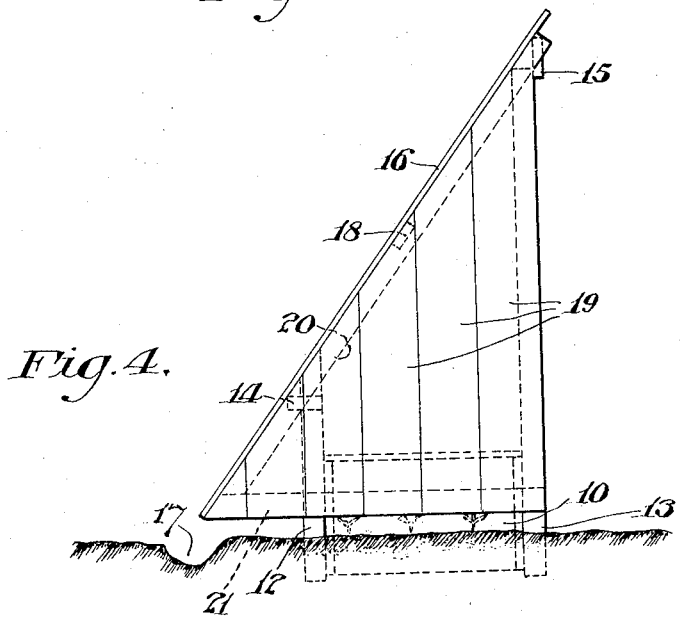
Fig. 4 is an end elevation thereof.

It will, of course, be understood that the drawings and description herein contained are illustrative merely, and that various changes and modifications may be made in the structure disclosed without departing from the spirit of my invention.

Referring to the drawings, in the particular embodiment of my invention therein shown, 10 is a cold frame of any preferred construction, provided with the usual top sash 11. The framework of the structure of my invention may be made of scantlings, and in the preferred form there are provided short uprights 12 and long uprights 13. At the upper ends of the uprights there are secured horizontally extending members 14 and 15, which serve as a means for securing inclined boards 16, disposed above the cold frame.

The upper ends of the boards 16 extend to a point depending upon the highest position of the sun in a particular locality where the structure is used, so as to prevent any of the direct rays of the sun from falling upon the plant bed within the cold frame. The lower ends of the boards 16 extend to a point in proximity to, but preferably not reaching, the ground, thereby permitting the air to circulate and preventing it from being entrapped within the space enclosed by the structure.

A ditch 17 is preferably provided in the ground, at such location as to carry off the rain water which falls on the outer surfaces of the boards 16. In order to preserve the continuity of the surfaces of the respective boards 16 intermediate the points of support by the members 14 and 15, there is provided an intermediate horizontally extending member 18 to which the middle portions of the boards 16 are secured.

The ends of the structure are preferably closed by means of vertically extending boards 19, which are secured to the inclined framing member 20 and the horizontal framing member 21, which may in turn be secured to the uprights 12 and 13 at the ends of the structure.

All of the surfaces of the structure are painted a light color, preferably white, so as to reflect the light falling thereon and to direct the same towards the plant bed. In the preferred arrangement as shown in Fig. 1 of the drawings, the structures are so positioned with respect to each other that the direct rays of the sun falling upon the outer surfaces of the inclined boards 16 will be reflected to the under surfaces of the inclined boards 16 of an adjacent structure, and be thence reflected to the plant bed.

As the walls of the structure are preferably made of boards, they will naturally be opaque, that is to say, of a non-translucent quality, so that the direct rays of the sun will not be permitted to reach the plants. However, by reason of the peculiar reflecting qualities of the surfaces of said boards, a larger amount of properly modified light will be directed upon the plants than would ordinarily be obtained from the northern sky alone.

It will be noted also that the structures are arranged with their open sides to the north, so that most of the light from the northern sky will fall directly upon the plant bed, although the light from the extreme north will first fall upon the under surfaces of the inclined boards 16, whence it will be reflected upon the plant bed.

By the foregoing arrangement the plants in the process of development will be shielded at all times from the direct rays of the sun, while at the same time the utmost possible quantity of the reflected modified light will be directed thereon, it being, of course, understood that by reflected light is meant not only the light which is reflected from the outer surface of one of the structures to the inner surface of another, but also the light which is reflected from the northern sky.

While the scientific reason for the results obtained is not fully understood, it seems that attempts to propagate rhododendrons and similar plants in which any direct sunlight is used result in a high mortality, but on the other hand, I have found that modified sunlight, such as comes from the northern sky, or which may be obtained by reflection from painted surfaces, has a beneficial effect, and results in a much higher percentage of plants taking root and surviving, and this result is greatly enhanced by directing on to the plant bed as much of such modified light as is practicable.

The end boards 19 serve to prevent the direct sunlight from impinging upon the plant bed when the sun is to the east or west of the meridian. Of course, if the structure be made of considerably greater length than that of the plant bed, these boards 19 may be dispensed with.

It will be apparent that the structure may be made of any dimensions desired, and that the height and inclination of the main boards, as well as the relative location of the structures with respect to each other, will be varied according to local conditions.

I claim:

1. Means for promoting plant growth comprising a structure arranged adjacent a plant bed adapted at all times to shield the plant bed from the direct rays of the sun and having surfaces arranged to reflect indirect rays of the sun toward the plant bed.

2. Means for promoting plant growth comprising a structure arranged adjacent a plant bed adapted to shield the plant bed from the direct rays of the sun and having surfaces arranged to reflect the rays from the northern sky toward the plant bed.

3. Means for promoting plant growth comprising a structure arranged adjacent a plant bed, said structure being open on the northern side and closed on the southern side to shield the plant bed from the direct rays of the sun, and said structure having surfaces arranged to reflect the rays from the northern sky toward the plant bed.

4. Means for promoting plant growth comprising a structure arranged adjacent a plant bed, said structure being open on the northern side and having an opaque inclined wall on the southern side adapted to shield the plant bed from the direct rays of the sun, the under surface of said wall serving to reflect rays from the northern sky toward the plant bed.

5. Means for promoting plant growth comprising a structure arranged adjacent a plant bed, said structure being open on the northern side and having an opaque inclined wall on the southern side adapted to shield the plant bed from the direct rays of the sun, the under surface of said wall serving to reflect rays from the northern sky toward the plant bed, and the ends of said structure being closed to shield the plant bed from the direct rays of the sun when the sun is on either side of the meridian.

6. Means for promoting plant growth comprising a plurality of structures each arranged adjacent a plant bed, each of said structures being open on the northern side and closed on the southern side to shield the plant bed from the direct rays of the sun, each of said structures having surfaces arranged to reflect the rays from the northern sky toward its plant bed, said structures also being arranged in proximity to each other whereby the direct rays of the sun will be modified and reflected from the outer surface of one of the walls of one structure to the inner surfaces of the walls of an adjacent structure and thence to the plant bed.

7. Means for promoting plant growth comprising a plurality of structures each arranged adjacent a plant bed, each of said structures being open on the northern side and having an opaque inclined wall on the southern side adapted to shield the plant bed from the direct rays of the sun, the under surface of said wall serving to reflect the rays from the northern sky toward the plant bed, said structures being arranged in proximity to each other whereby the direct rays of the sun will be modified and reflected from the outer surface of the inclined wall of one structure to the inner surface of the inclined wall of an adjacent structure and thence to the plant bed.

8. Means for promoting plant growth comprising a pluarlity of structures each arranged adjacent a plant bed, each of said structures being open on the northern side and having an opaque inclined wall on the southern side adapted to shield the plant bed from the direct rays of the sun, the under surface of said wall serving to reflect the rays from the northern sky toward the plant bed, said structures being arranged in proximity to each other whereby the direct rays of the sun will be reflected from the outer surface of the inclined wall of one structure to the inner surface of the inclined wall of an adjacent structure and thence to the plant bed, and the ends of each of said structures being closed to shield the plant beds from the direct rays of the sun when the sun is on either side of the meridian.

9. The method of promoting plant growth which consists in shielding the plant bed at all times from the direct rays of the sun, and reflecting on said plant bed modified indirect rays of the sun in addition to those which would normally fall thereon.

In testimony whereof, I have hereunto signed my name.

GEORGE G. NEARING.